United States Patent
Van Overschelde et al.

(10) Patent No.: US 10,149,437 B2
(45) Date of Patent: Dec. 11, 2018

(54) FEEDER CONVEYOR ASSEMBLY TENSIONING MECHANISM

(71) Applicant: CNH Industrial America LLC, New Holland, PA (US)

(72) Inventors: Pieter Van Overschelde, Sint-Andries (BE); Björn Depoortere, Zwevezele (BE); Frank R. G. Duquesne, Zwevegem (BE); Dré W. J. Jongmans, AG Klundert (NL); Bart M. A. Missotten, Herent (BE); Frederik Tallir, Esen (BE); Willem Vandamme, Ichtegem (BE)

(73) Assignee: CNH Industrial America LLC, New Holland, PA (US)

( * ) Notice: Subject to any disclaimer, the term of this patent is extended or adjusted under 35 U.S.C. 154(b) by 10 days.

(21) Appl. No.: 15/446,645

(22) Filed: Mar. 1, 2017

(65) Prior Publication Data

US 2017/0251606 A1 Sep. 7, 2017

(30) Foreign Application Priority Data

Mar. 1, 2016 (BE) .................................. 2016/5146

(51) Int. Cl.
*A01F 12/10* (2006.01)
*A01D 41/16* (2006.01)
*A01D 61/02* (2006.01)

(52) U.S. Cl.
CPC .............. *A01F 12/10* (2013.01); *A01D 41/16* (2013.01); *A01D 61/02* (2013.01)

(58) Field of Classification Search
CPC ...... A01D 61/008; A01D 61/04; B65G 23/44; B65G 15/52; A01F 12/10
See application file for complete search history.

(56) References Cited

U.S. PATENT DOCUMENTS

| | | | | | |
|---|---|---|---|---|---|
| 3,699,753 | A | * | 10/1972 | Peak | A01D 61/008 56/14.5 |
| 3,804,231 | A | * | 4/1974 | Maiste | A01D 45/021 198/728 |

(Continued)

FOREIGN PATENT DOCUMENTS

| | | |
|---|---|---|
| DE | 102005027841 A1 | 1/2007 |
| DE | 102009036104 A1 | 2/2011 |

(Continued)

*Primary Examiner* — Arpad Fabian-Kovacs
(74) *Attorney, Agent, or Firm* — Patrick M. Sheldrake; Peter K. Zacharias

(57) ABSTRACT

A feeder for a combine harvester, the feeder including a housing and a conveyor assembly mounted in the housing. The conveyor assembly includes a frame having lateral support arms, and moveable belts guided by sprocket wheels. The sprocket wheels are mounted on a drive shaft proximate an outlet section of the housing and on a conveyor shaft proximate an inlet section of the housing. The sprocket wheels are mounted on a drive shaft proximate an outlet section of the housing and on a conveyor shaft proximate an inlet section. The conveyor assembly is equipped with a first and second tensioning mechanism, the first mechanism being configured to push the conveyor shaft forward with respect to the frame, the second mechanism including spring-operated tensioning arms and tensioning rolls mounted above the support arms.

12 Claims, 8 Drawing Sheets

(56) References Cited

U.S. PATENT DOCUMENTS

| | | | | |
|---|---|---|---|---|
| 3,854,572 | A * | 12/1974 | Maiste | A01D 41/142 198/507 |
| 3,863,431 | A * | 2/1975 | Fowler | A01D 45/10 56/11.9 |
| 3,930,323 | A * | 1/1976 | Marold | E02F 3/6454 198/813 |
| 3,934,362 | A * | 1/1976 | Hyler | E02F 3/6472 37/415 |
| 4,038,809 | A * | 8/1977 | Arnould | A01D 57/20 56/124 |
| 4,128,952 | A * | 12/1978 | Duke | B65G 23/44 198/813 |
| 4,133,225 | A * | 1/1979 | Love | A01D 41/142 475/19 |
| 4,271,660 | A | 6/1981 | Kloefkorn et al. | |
| 4,362,005 | A * | 12/1982 | Hanaway | A01D 41/14 198/814 |
| 4,369,617 | A * | 1/1983 | Hanaway | A01D 61/008 198/814 |
| 4,430,847 | A * | 2/1984 | Tourdot | A01D 41/1274 474/1 |
| 4,648,239 | A | 3/1987 | Geiser et al. | |
| 5,026,326 | A * | 6/1991 | Pollich | F16H 7/12 198/813 |
| 5,030,173 | A * | 7/1991 | Bryant | B65G 23/44 474/136 |
| 5,334,106 | A * | 8/1994 | Purcell | B62D 55/305 305/145 |
| 5,641,058 | A * | 6/1997 | Merten | B65G 23/44 198/810.04 |
| 6,116,008 | A * | 9/2000 | Digman | A01D 41/16 56/15.8 |
| 6,516,941 | B1 * | 2/2003 | Buhne | B65G 23/44 198/314 |
| 7,052,423 | B2 * | 5/2006 | Jonckheere | A01D 41/142 474/148 |
| 7,473,168 | B2 * | 1/2009 | Day | A01D 61/04 460/16 |
| 7,600,362 | B2 * | 10/2009 | Wernsmann | A01D 61/008 56/14.5 |
| 7,766,736 | B2 * | 8/2010 | Ramp | A01F 12/10 460/16 |
| 8,146,734 | B2 * | 4/2012 | Shoji | B65G 21/10 198/813 |
| 8,596,447 | B2 * | 12/2013 | Gentz | B65G 15/52 198/731 |
| 8,851,276 | B2 * | 10/2014 | Strieker | B65G 15/60 198/810.04 |
| 2004/0250523 | A1 | 12/2004 | Schulz | |
| 2006/0016165 | A1 | 1/2006 | Wernsmann et al. | |
| 2006/0278499 | A1 | 12/2006 | Grywacheski et al. | |
| 2012/0186949 | A1 | 7/2012 | Gentz | |
| 2013/0313077 | A1 * | 11/2013 | Boyd | A01D 61/008 198/617 |
| 2015/0089915 | A1 | 4/2015 | Schroeder | |
| 2015/0366139 | A1 * | 12/2015 | Rittershofer | A01D 41/12 460/114 |

FOREIGN PATENT DOCUMENTS

| | | |
|---|---|---|
| DE | 102012223769 A1 | 6/2014 |
| DE | 102013109579 A1 | 3/2015 |
| DE | 102013226436 A1 | 6/2015 |
| EP | 2666349 A1 | 11/2013 |
| JP | 2014036617 A | 2/2014 |

* cited by examiner

FEEDER CONVEYOR ASSEMBLY TENSIONING MECHANISM

CROSS REFERENCE TO RELATED APPLICATION

This application claims priority to Belgium Application No. 2016/5146 filed Mar. 1, 2016, the contents of which are incorporated herein by reference.

FIELD OF THE INVENTION

The present invention is related to combine harvesters, in particular to an apparatus referred to as the feeder which transports the harvested crops from the combine header to the threshing rotors.

BACKGROUND OF THE INVENTION

Agricultural combine harvesters are machines designed for harvesting and processing crops such as wheat or corn. Crops are cut from the field on a wide area by the header mounted at the front of the combine. By an auger or a belt system mounted in the header, the harvested material is brought to a central area of the header, and from there it is transported by the feeder to a threshing mechanism comprising laterally or longitudinally mounted threshing rotors and further to the cleaning section comprising a number of sieves where grains are separated from any remaining crop residue.

The feeder typically comprises a set of chains or belts guided by sprocket wheels mounted at the front and back of a feeder housing, and with transversal slats attached to the chains or belts. The crops are pressed between the moving slats and the floor of the feeder housing and transported in this way from the inlet of the feeder to the outlet, where the crops are fed to the threshing rotors of the combine.

Improvements in the threshing and cleaning sections of modern combine harvesters have increased the capacity of these sections, which requires also an increased throughput through the feeder. One crucial area that determines this throughput is the transition area between the header and the feeder, where crops tend to accumulate in a so-called 'dead zone'. Document U.S. Pat. No. 4,271,660 discloses a feeder wherein the front drum is provided with retractable fingers rotating about an eccentrically placed axle, so as to grab a higher amount of crops in the transition area and thereby eliminate or lessen the effect of the 'dead zone'. The slats are attached to chains rotating on a pair of sprocket wheels. It is a known problem however that chains are liable to shift with respect to the sprockets under the influence of high forces. Such a shift would interfere with the timing of transversal slats relative to the retractable fingers, which may lead to a collision between the fingers and the transversal slats. The shifting of chains or belts in the feeder is a drawback in any feeder design, regardless of the presence of the retractable fingers. In the case of belts, inadequate tensioning of these belts is often at the root of the problem.

SUMMARY OF THE INVENTION

The present invention is related to a feeder apparatus, hereafter named 'feeder', for a combine harvester, as disclosed in the appended claims. Any technically feasible combination of claims is disclosed, not only the combinations derivable from the claim dependencies. The feeder of the invention comprises a housing and a conveyor assembly mounted in the housing, the conveyor assembly comprising a frame comprising lateral support arms, and moveable belts guided by sprocket wheels. The sprocket wheels are mounted on a drive shaft proximate an outlet section of the housing and on a conveyor shaft proximate an inlet section of the housing. The conveyor assembly is equipped with a first and second tensioning mechanism, the first mechanism being configured to push the conveyor shaft forward with respect to the frame, the second mechanism comprising spring-operated tensioning arms and tensioning rolls mounted above the support arms.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

Preferred embodiments will now be described with reference to the drawings. The detailed description is not limiting the scope of the invention, which is defined only by the appended claims. The terms 'front', 'frontal', 'forward', 'back', 'backwards' are referenced with respect to the direction in which crops move through the feeder, the 'front' of the feeder being the end where crops enter the feeder, the 'back' being the end where crops exit the feeder.

Figure 1:
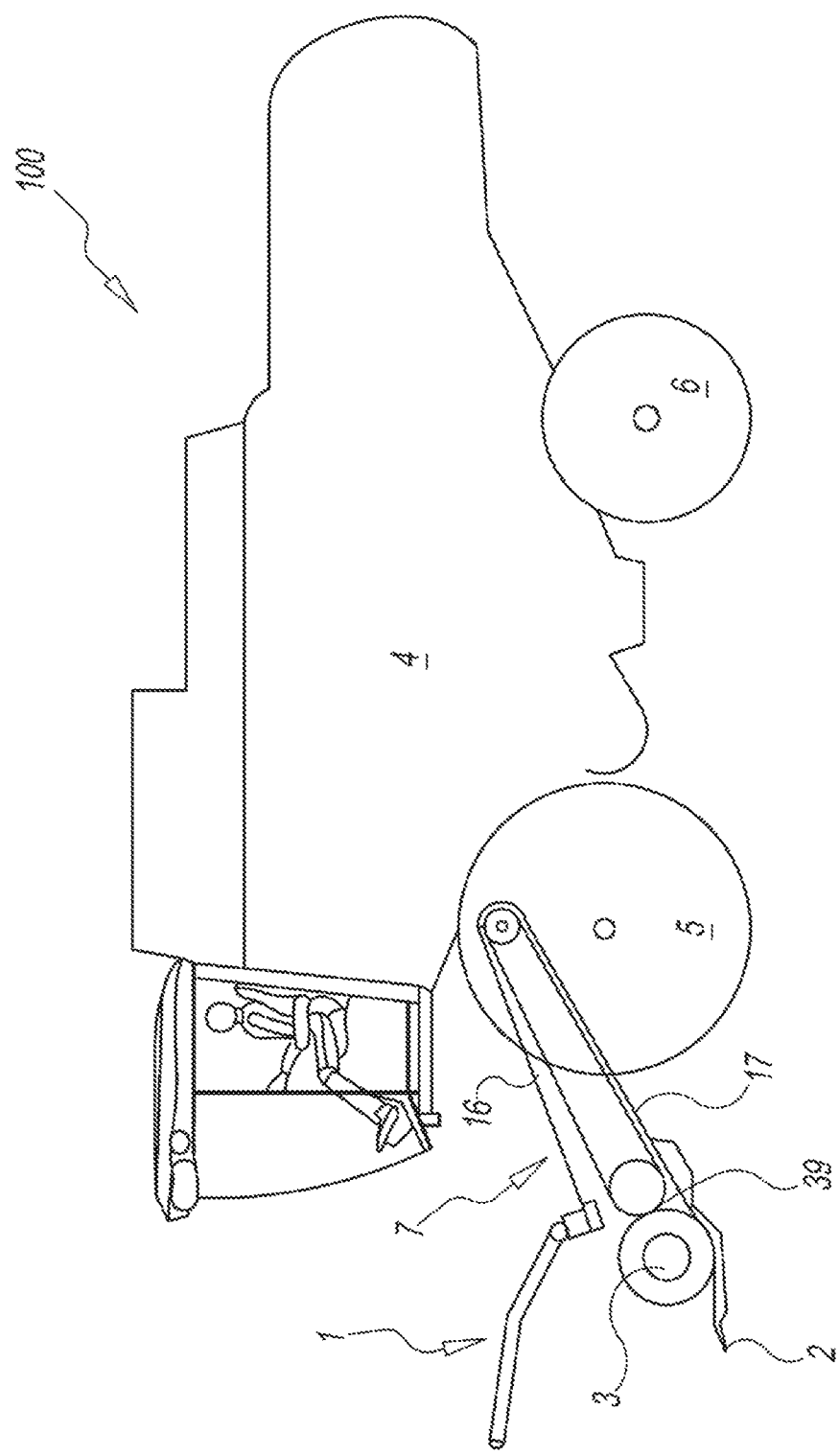
FIG. 1 is a schematic side view of a combine header, indicating the position of the header and the feeder at the front of the machine.

FIG. 1 shows a side view of a combine harvester 100, comprising a header 1 mounted at the front of the combine. The header comprises knives 2 maintained at a given height above ground level while the combine moves through a field of crops that are to be harvested. Cut crops are transported from both lateral sides of the header towards a central area by an auger 3. The main body 4 of the combine is supported by front and rear wheels 5 and 6 and comprises the threshing rotors and cleaning section generally known by the skilled reader and not depicted as such in FIG. 1. From the central area of the header 1, crops are transported into the main body 4 of the combine by a feeder 7. The feeder 7 is inclined upwards from the header 1 towards the main body 4. The feeder 7 is the focus of the present invention and a number of embodiments of the feeder according to the invention will be described hereafter.

Figure 2:
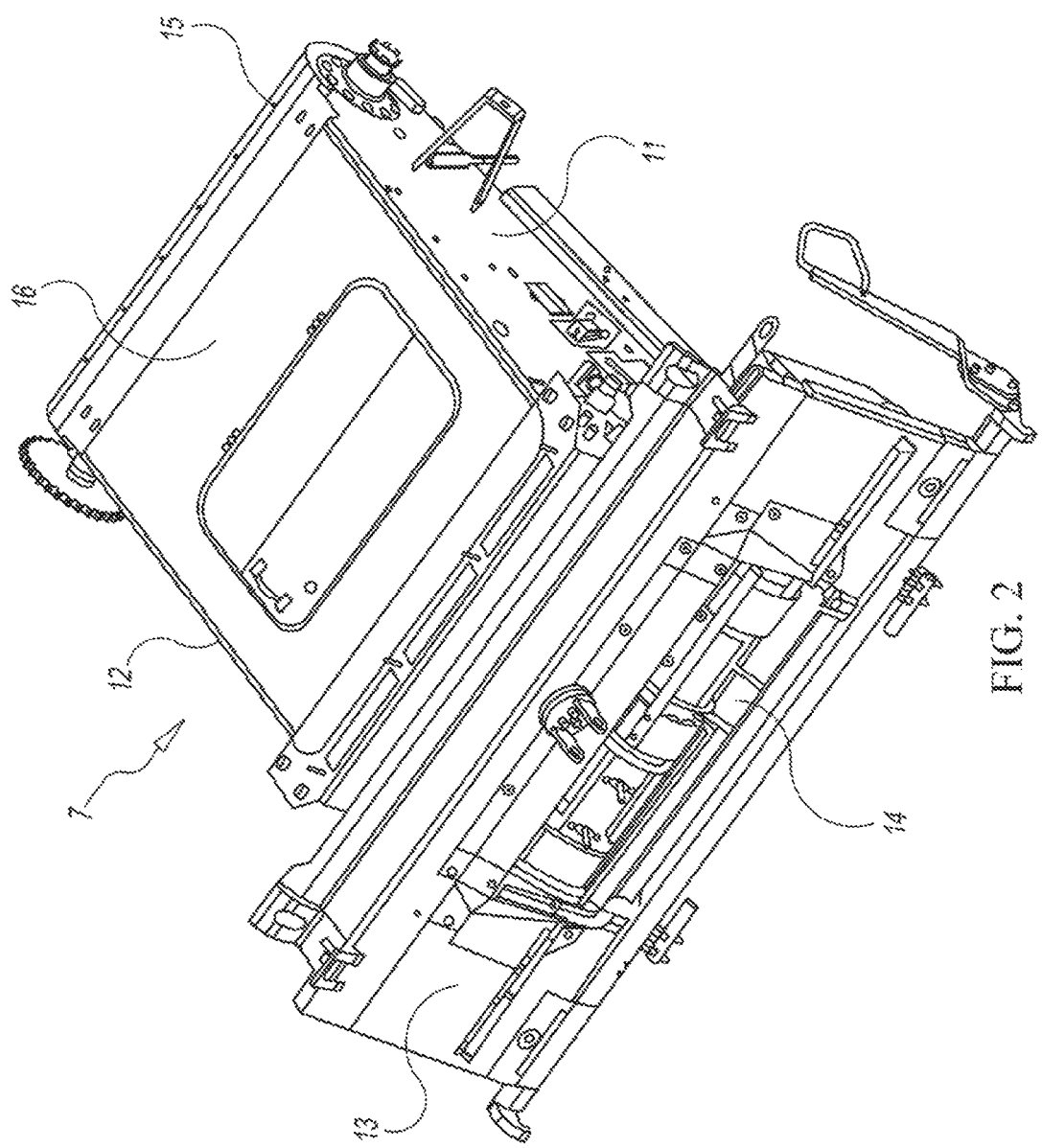
FIG. 2 shows a feeder according to an embodiment of the invention.
Figure 3:
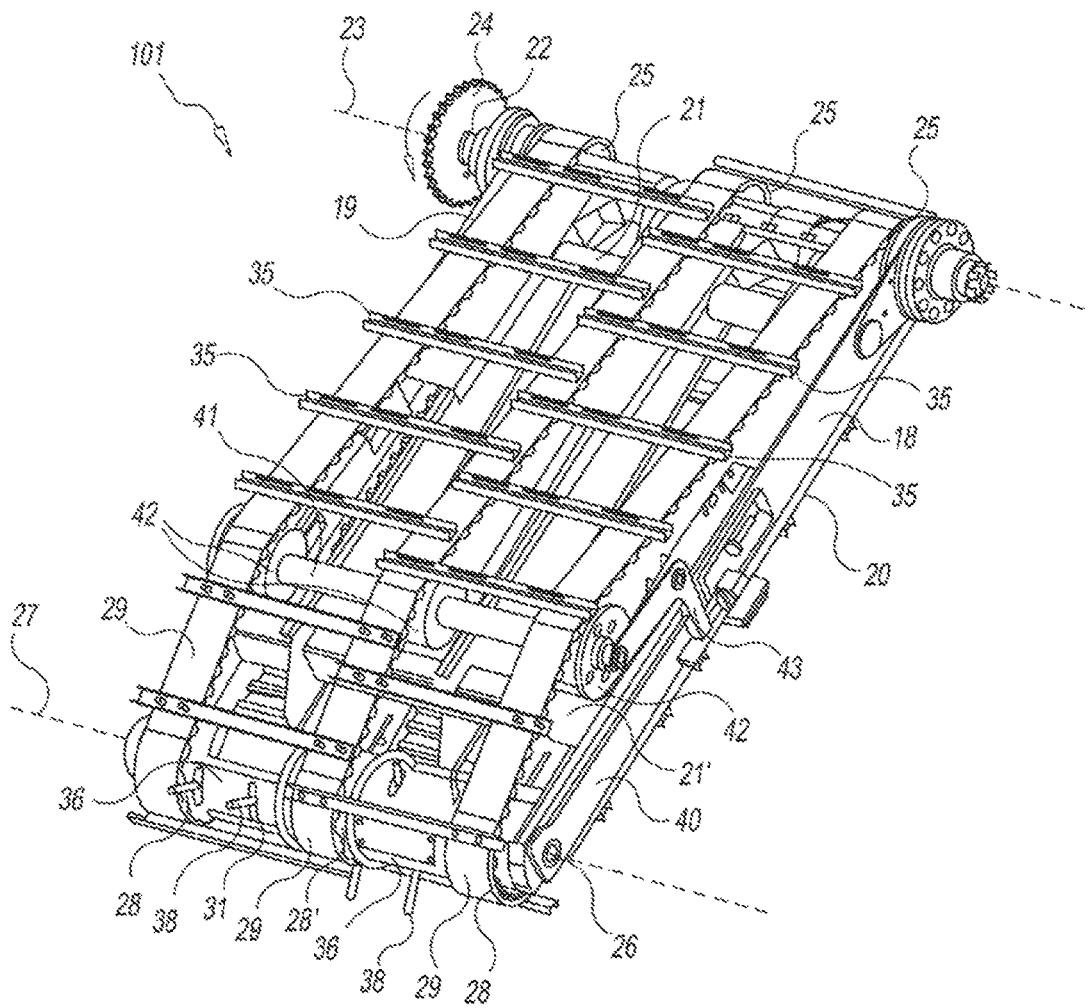
FIG. 3 shows the conveyor assembly integrated in the feeder shown in FIG. 2.

FIG. 2 shows a perspective view of the feeder 7 according to an embodiment of the invention. The feeder comprises a feeder housing and a conveyor assembly mounted inside the housing. FIG. 3 shows the conveyor assembly 101 as such. The feeder housing comprises side walls 11 and 12 and a front wall 13, an outlet section 15 at the back of the feeder, a ceiling 16 and a floor 17 (see FIG. 1). The front wall 13 is provided with an inlet section 14. The front wall 13 is furthermore configured to receive the combine header 1, with the central area of the combine header facing the inlet section 14, so that harvested crops may be fed from the header's central area through the inlet section 14 into the feeder 7.

Figure 4:
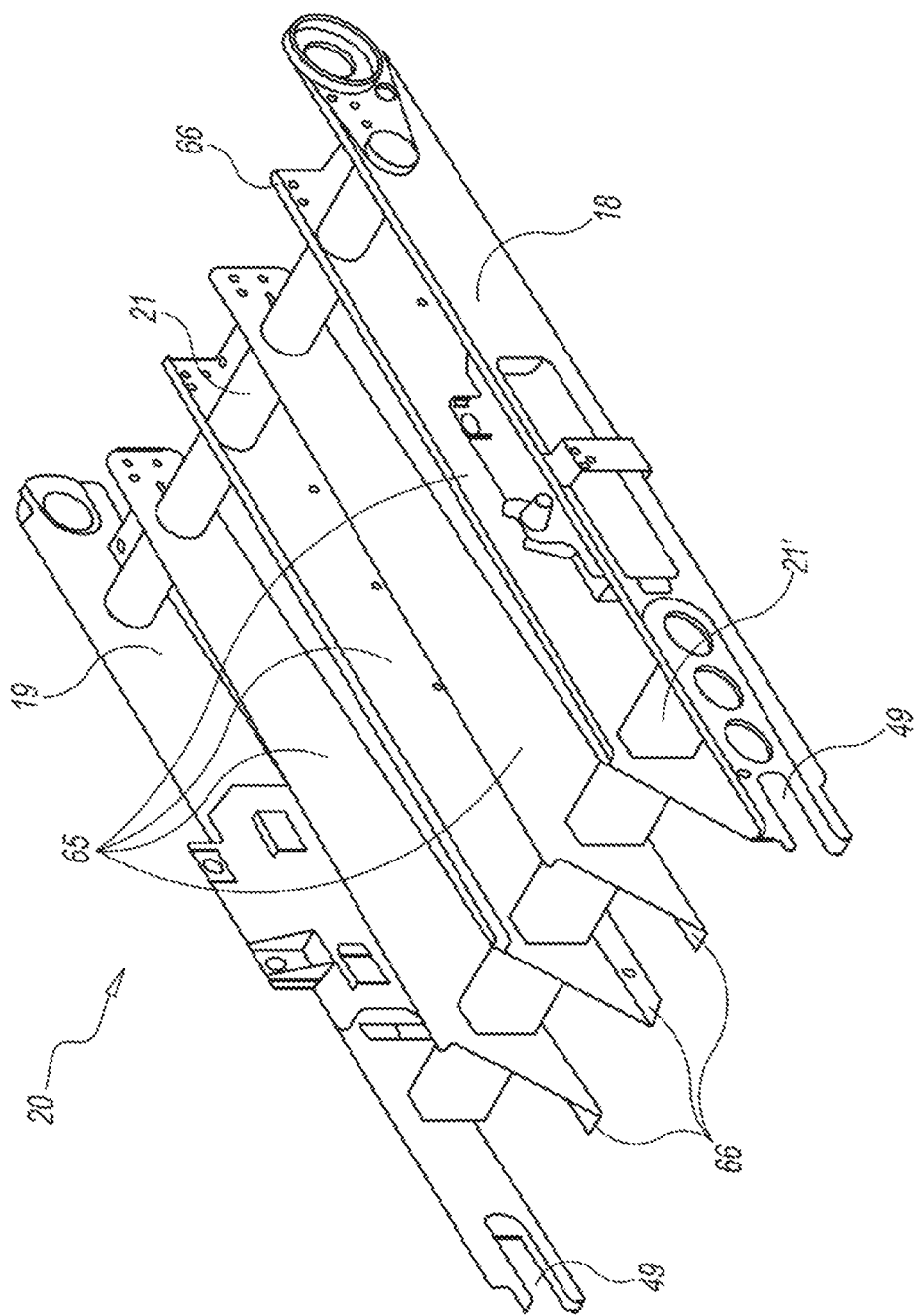
FIG. 4 is a view of the frame of the conveyor assembly in the embodiment of FIG. 3.

As seen in FIG. 3, the conveyor assembly 101 comprises a frame 20 onto which the various components of the crop transport mechanism are built. The frame 20 comprises a first lateral support arm 18 and a second lateral support arm 19. The support arms are preferably flat and vertically oriented as shown in the drawings. The support arms are preferably maintained at a fixed distance from each other by connection beams 21/21' at the rear and front of the assembly. A view of the frame 20 as such is shown in FIG. 4.

The crop transport mechanism comprises a drive shaft 22 rotatable about an upper rotation axis 23 arranged proximate the outlet section 15 of the feeder housing and the back end of the frame 20. The rotation axis 23 is stationary with respect to the frame 20 and the feeder housing, and essentially perpendicular with respect to the side walls 11/12 of the housing and with respect to the support arms 18/19 of the frame 20. The drive shaft's rotation is actuated by the power source of the combine harvester, preferably through a gear transmission. The gear wheel 24 attached to the drive shaft is shown in the figures.

Three upper sprocket wheels 25 are mounted on and coaxial with the drive shaft 22, i.e. the sprocket wheels 25 rotate together with the drive shaft 22. At the front end of the frame 20, a conveyor shaft 26 is mounted, proximate the inlet section 14 of the feeder housing The conveyor shaft 26 is rotatable about a lower rotation axis 27, parallel to the upper rotation axis 23. Two laterally placed lower sprocket wheels 28 and one central guide drum 28' are mounted on the conveyor shaft 26 and are coaxial with the conveyor shaft 26, i.e. the lower sprocket wheels 28 and guide drum 28' rotate together with the conveyor shaft 26. The sprocket wheels 28 and the guide drum 28' are preferably produced as parts of a single welded assembly. The guide drum 28' may alternatively be a third sprocket wheel 28. The positions of the lower sprocket wheels 28 correspond to the positions of the left and right upper sprocket wheels 25. A toothed belt 29 is mounted on each pair of corresponding upper and lower sprocket wheels 25/28, the teeth of the belts engaging with the sprockets of the sprocket wheels. A central toothed belt 29 is mounted on the central upper sprocket wheel 25 and the central guide drum 28'.

The rotation of the drive shaft 22 in the direction indicated by the arrow actuates the forward movement of the belts 29 along the upper area of the conveyor assembly, the rotation of the conveyor shaft 26, and the backward movement of the belts along the bottom area of the conveyor assembly. Transversal slats 35 are attached to the belts at regular distances, and serve to drag a mat of crops along the feeder floor 17, from the inlet opening 14 of the feeder towards the outlet section 15. The belts 29, the sprocket wheels 25/28 and the transversal slats 35 can be executed in terms of their shape and material according to similar mechanisms presently known in the art.

In the embodiment shown in the drawings, the frame 20 itself, and thereby the conveyor assembly as such, is pivotably mounted in the feeder housing, being pivotable about pivot axis 21 located at the top of the housing. Preferably the pivot axis 21 coincides with the upper rotation axis 23. In this way, the conveyor assembly compresses the mat of upwardly moving crops by its weight exerted on this mat of moving crops.

Between the lower sprocket wheels 28 and the guide drum 28' mounted on the conveyor shaft 26, conveyor drums 36 are mounted on the conveyor shaft 26, i.e. the drums 36 are rotating together with the conveyor shaft 26 and together with the sprocket wheels 28 and guide drum 28'. Preferably the conveyor drums 36 are equally part of the single welded assembly referred to above. The conveyor drums 36 have openings 37 through which retractable fingers 38 are protruding. The fingers are rotatably mounted on stationary eccentric axles inside the conveyor drums 36, in such a manner that the fingers extend out of the drums as they pass through a front portion of the circumference of the drums 36, corresponding to the transition area 39 between the header 2 and the feeder 7 (see FIG. 1), and retract into the drums 36 as they pass through the opposite area at the back of the circumference of the conveyor drums 36. The operation mechanism of these retractable fingers 38 is thereby no different from similar mechanisms known in header augers or from the retractable fingers in the conveyor drums of the feeder described in U.S. Pat. No. 4,271,660. The retractable fingers 38 thereby increase the throughput through the feeder by grabbing crops in the transition area 39 between the header and the feeder, thereby alleviating the 'dead zone' problem referred to above.

The feeder of the invention is provided with a tensioning system which allows fine-tuning of the belt tension. The tensioning system is configured so that the tensioning of the belts is done in two stages. Firstly, the conveyor shaft 26 is movable forwards with respect to the frame 20 via first tensioning arms 40, mounted laterally with respect to the first and second support arms 18/19 of the frame 20. Secondly, a tensioning axle 41 is mounted above the frame 20, and provided with rotatable tensioning drums 42, configured to provide additional tensioning of the belts 29 via a pair of second tensioning arms 43. The first tensioning arms 40 are configured to set the tension of the belts to a predefined value within fairly broad limits. The second tensioning arms 43 are spring-operated as will be described further in this specification, and configured to fine-tune the belt tension to a value required to maintain the active contact between the teeth of the belts 29 and the sprockets of the sprocket wheels 25/28, i.e. shifting of the belts with respect to the sprocket wheels is prevented. This is especially beneficial when used in combination with the retractable fingers 38 described above, as the timing between the slats 35 and the fingers 38 remains intact. The two-stage tensioning according to the invention is however applicable also to a feeder not equipped with retractable fingers 38.

Figure 5:
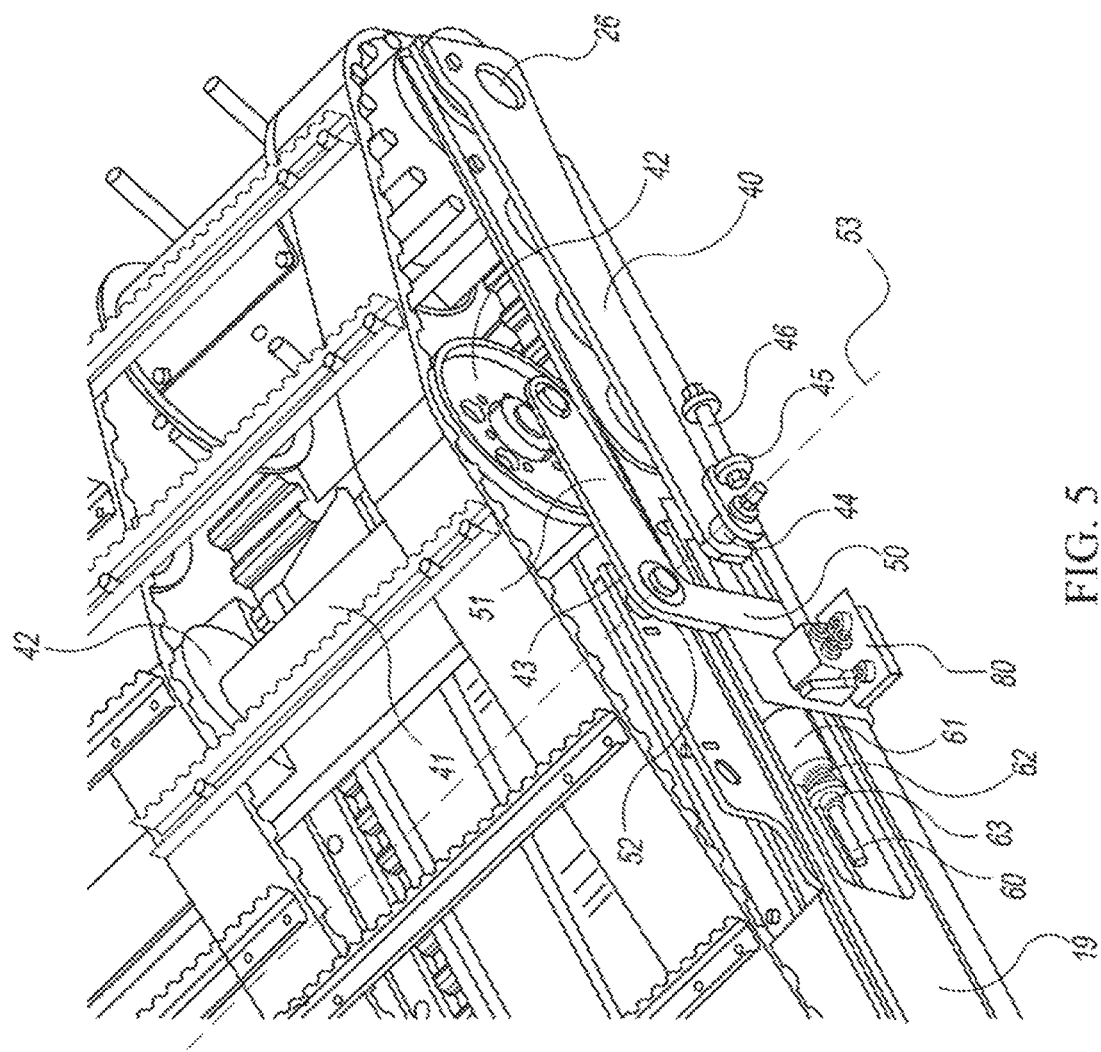
FIG. 5 is a detail of the conveyor assembly of FIG. 3, illustrating the tensioning mechanisms.

A detail of the components for realizing the coarse and fine tensioning of the belts according to a preferred embodiment is shown in FIG. 5. The first tensioning arms 40 are flat and mounted upright and laterally with respect to the support arms 18/19 of the frame 20. At the front, the first tensioning arms 40 are rotatably connected to the conveyor shaft 26, which is in turn movable forwards and backwards whilst remaining within the confines of U-shaped cavities 49 provided at the front of the support arms 18/19 of the frame 20. These U-shaped cavities 49 are visible in the image of the frame 20 shown in FIG. 4. The U-shaped openings are closed by a stopper surface attached at the front of the support arms 18/19 (not shown in FIG. 4), defining the most forward position of the conveyor shaft 26. At the back end of the first tensioning arms 40, these arms are rotatably connected to an auxiliary axle 44 that is itself fixed to a tensioning piece 45 formed by two plate-shaped portions at a right angle. The auxiliary axle 44 is bolted to one plate shaped portion, while the other plate shaped portion is connected to a tensioning bolt 46. The tensioning bolt is accessible through a side opening in the feeder housing. The tensioning bolt 46 is furthermore adjustable with respect to a surface (not shown) that is perpendicular to the tensioning arm 40 and fixed to the feeder housing. In this way, by turning the tensioning bolt 46, the first tensioning arm 40 attached to said bolt via axle 44 can be moved forwards with respect to the frame 20, thereby pushing the conveyor shaft 26 forwards within the U-shaped cavity 49, and thereby applying a tension to the belts 29. Tensioning bolts 46 are present on both sides of the frame 20, allowing the adjustment of the conveyor shaft 26 and the setting of the belt tension on both sides of the frame 20.

The second tensioning mechanism for fine-tuning the belt tension in the embodiment shown operates via a pair of angle-shaped second tensioning arms 43. Each of these second tensioning arms 43 comprises an upright leg portion 50 and an essentially level leg portion 51, with a corner portion 52 between the two. The corner portions 52 of the second tensioning arms 43 are rotatable with respect to the frame 20, about a single rotation axis 53 that is stationary with respect to the frame 20. The tensioning axle 41 carrying the tensioning drums 42 is rotatably connected to the ends of the level leg portions 51. At the lower ends of the upright leg portions 50, each of the second tensioning arms 43 is connected to a spring-operated mechanism, configured to be able to move the lower end of the upright leg portions 50 forwards or backwards with respect to the frame 20. Pushing the upright leg portion 50 forwards causes an upward rotation of the ends of the level leg portion 51 through rotation of the second tensioning arms 43 about the single rotation axis 53. The upward movement of the ends of the level leg portion 51 exerts a tensioning force on the belts 29 via the tensioning axle 41 and the tensioning drums 42.

Figure 8:
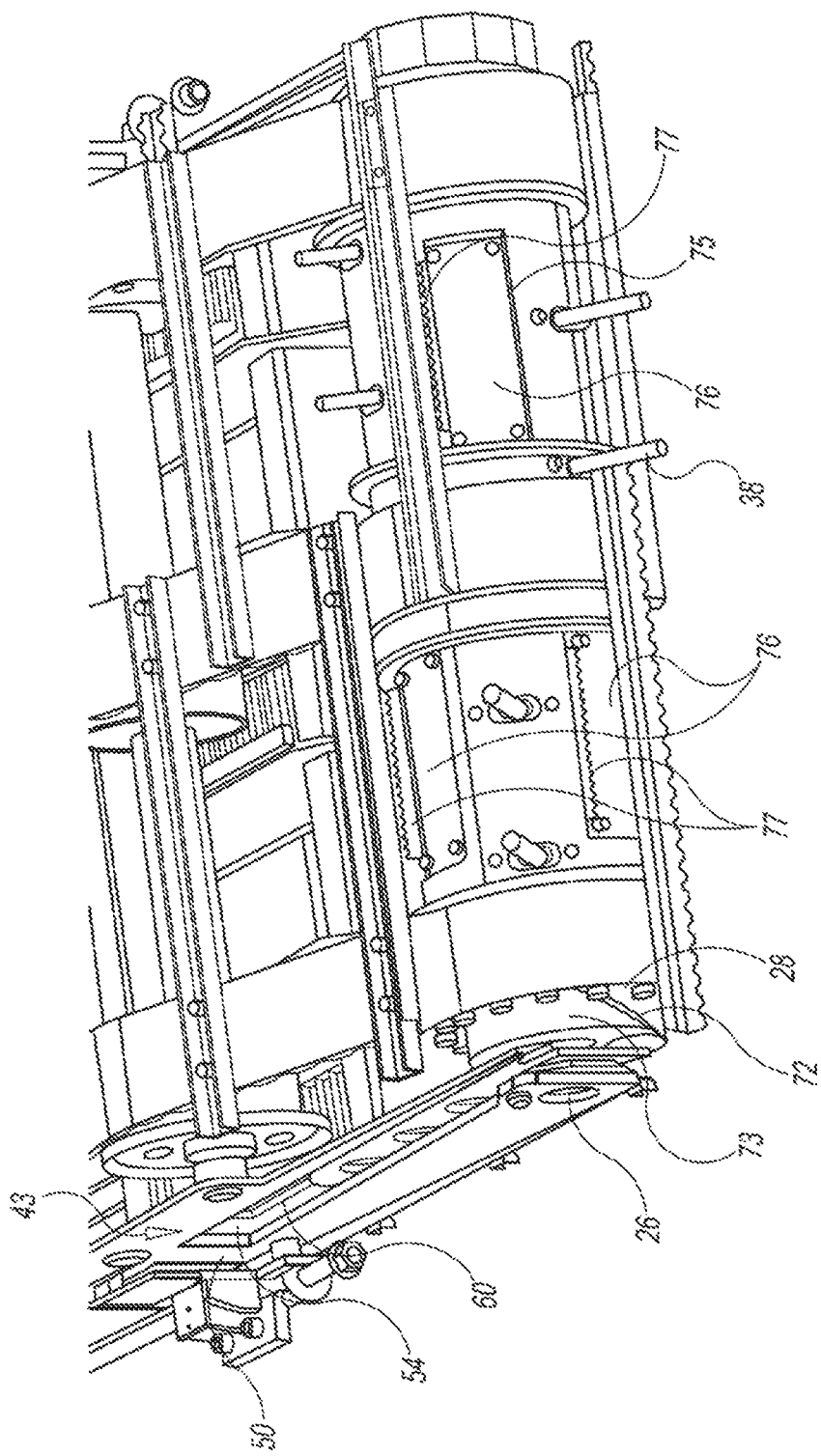
FIG. 8 is a detail of the conveyor shaft, including similar helicoidal scrapers.

The spring-operated mechanism for controlling the second tensioning arms 43 comprises a rod 60 fixed to the frame 20 at the right hand side of the rod as seen in FIG. 5. The rod is inserted in a hollow cylinder 61 that is equally held stationary with respect to the frame 20. An actuator with a central hole in it is placed around the rod 60 and put in contact at one end with a plate welded at the lower end of the upright leg portion 50. This plate and the actuator are not visible in FIG. 5 as they are located behind the upright leg portion 50. FIG. 8 however shows the plate 54 welded at the lower end of the upright leg portion 50 of the angle-shaped arm 43. The actuator may have the shape of a hollow tube with a head portion at one end so that the rod 60 may be inserted in the tube and through a central opening in the head portion, the head portion having a flat back side and a sphere-shaped front side. The sphere-shaped front side then pushes against the plate 54 welded at the lower end of the upright leg portion 50. At the other end a spring 62 is inserted in the cylinder 61 and placed against the back side of the actuator (in the above case, the spring 62 is placed around the tube and pushes against the flat back side of the head portion). The actuator is slidable with respect to the rod 60. The spring 62 can be compressed by turning a screw 63 about the threaded end of the rod 60. In this way, the compressed spring exerts a force on the end of the upright leg portion 50, thereby exerting a tensioning force on the tensioning axle 41 as described above. Further compressing the spring increases the tensioning force. Releasing the spring decreases the tensioning force. Careful dimensioning of the spring and the second tensioning arms 43, as a function of the strength characteristics of the belts 29, allows to set the belt tension at an accurately defined value, suitable for maintaining optimal contact between the belts 29 and the sprocket wheels 25/28. According to a preferred embodiment, tensioning of the belts is done by first moving the belts forward by the first tensioning mechanism (first tensioning arms 40, operated by tensioning bolts 46), until the conveyor shaft reaches the most forward position, defined by a stopper surface attached at the front of the U-shaped cavities 49. Then the spring-operated tensioning mechanism is set to a suitable tensioning force. The spring 62 allows upward or downward movement of the tensioning axle 41 during operation, to compensate for sudden changes in the load, for example when debris enters the header. These changes in the load are thus compensated without a forward or backward movement of the conveyor shaft 26 as it is the case in some presently known feeders. In other words, in the feeder of the invention, the distance between the auger 3 of the header and the conveyor shaft 26 remains constant during operation. This is beneficial for realising a steady throughput through the feeder.

The block 80 with 3 bolts functions as a bump that rests on a stopper plate. This stopper plate is adjustable so that the height of the bump is adjustable. The function of the stopper plate is to limit the lower position of the front drum 36, so that it doesn't hit the feeder floor. This block 80 therefore has no functional relation with the tensioning systems described above.

It is emphasized that the components described above for applying a coarse and fine tensioning of the belts are described by way of example. The skilled person is capable of devising equivalent systems which execute the same functions. The invention is thus not limited to the details described above and shown in the drawings. Also, the invention is not limited to a feeder equipped with three belts 29 as shown in the drawings. A minimum of two belts is required.

Figure 6:
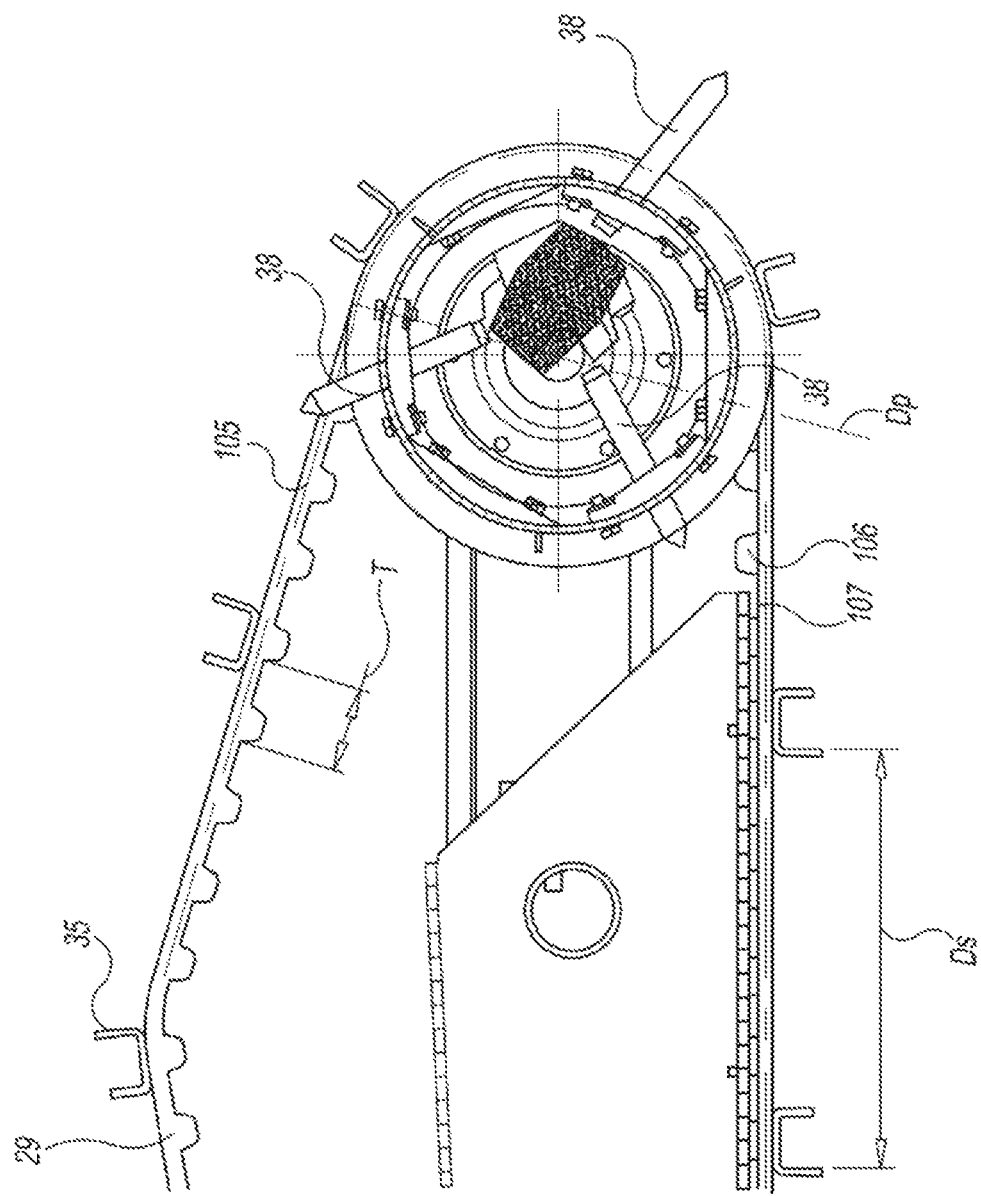
FIG. 6 illustrates a number of dimensional parameters in a preferred embodiment of the invention.

In the embodiments equipped with retractable fingers 38, the timing between the retractable fingers 38 and the transversal slats 35 can be optimized by a judicial design of a number of dimensions. For this purpose, the following relationships are required (as illustrated in FIG. 6) for each of the belts 29 engaging with a sprocket wheel 28 mounted on the conveyor shaft 26:

$$Lp = X \cdot Ds = X \cdot (T \cdot ZD)/Rf = X \cdot (Dp \cdot \Box)/Rf \qquad (1)$$

with:

Lp=pitch length of a belt. This is the length of the neutral line of the belt. The neutral line 105 is shown in FIG. 6. The belt 29 comprises teeth 106 and a flat belt portion 107. The neutral line 105 is perpendicular to the rotation axis 27 of the conveyor shaft 26 and situated at half the thickness of the flat belt portion 107.

X=an integer

Ds=the distance between two adjacent slats 35,

T=the pitch of the teeth on a toothed belt 29,

ZD=the number of sprockets on a sprocket wheel 28 mounted on the conveyor shaft 26, Rf=the number of retractable fingers 38 at one position along the longitudinal direction of the conveyor shaft 26 (i.e. Rf is equal to 3 in the embodiment shown in FIG. 6)

Dp=diameter of the neutral line 105 of the belt 29 in the area where the belt is in contact with the sprocket wheel 28 on the conveyor shaft 26.

The '=' signs in formula (1) need to be interpreted in a technical and not a strictly mathematical sense, taking into account normal measurement errors in the determination of the parameters in question. The formulas (1) are to be fulfilled at least when the belt 29 is under operational tension and when the feeder is not running. The depicted parameters Lp, T, Dp and Ds are to be regarded for the operational state of the belt where the belt is tensioned to its nominal length after installation, meaning that no additional elongation of the belt due to tensioning of the belt or belt loads has occurred yet. When the above relationships are fulfilled, the timing between the slats 35 and the retractable fingers 38 is optimized.

FIG. 4 shows an additional feature of certain embodiments of the invention. In the embodiment shown, the frame 20 is provided with intermediate support arms 65 distributed across the width of the frame, between the outer support arms 18/19 and parallel thereto. At the lower rim of these intermediate support arms 65, flat guide strips 66 are formed extending along the length of the intermediate support arms 65. These strips 66 serve to support the transversal slats 35 as they move along the floor of the feeder housing, thereby preventing the compressed crops from pushing the slats 35 and thereby the belts 29 upwards.

Figure 7:
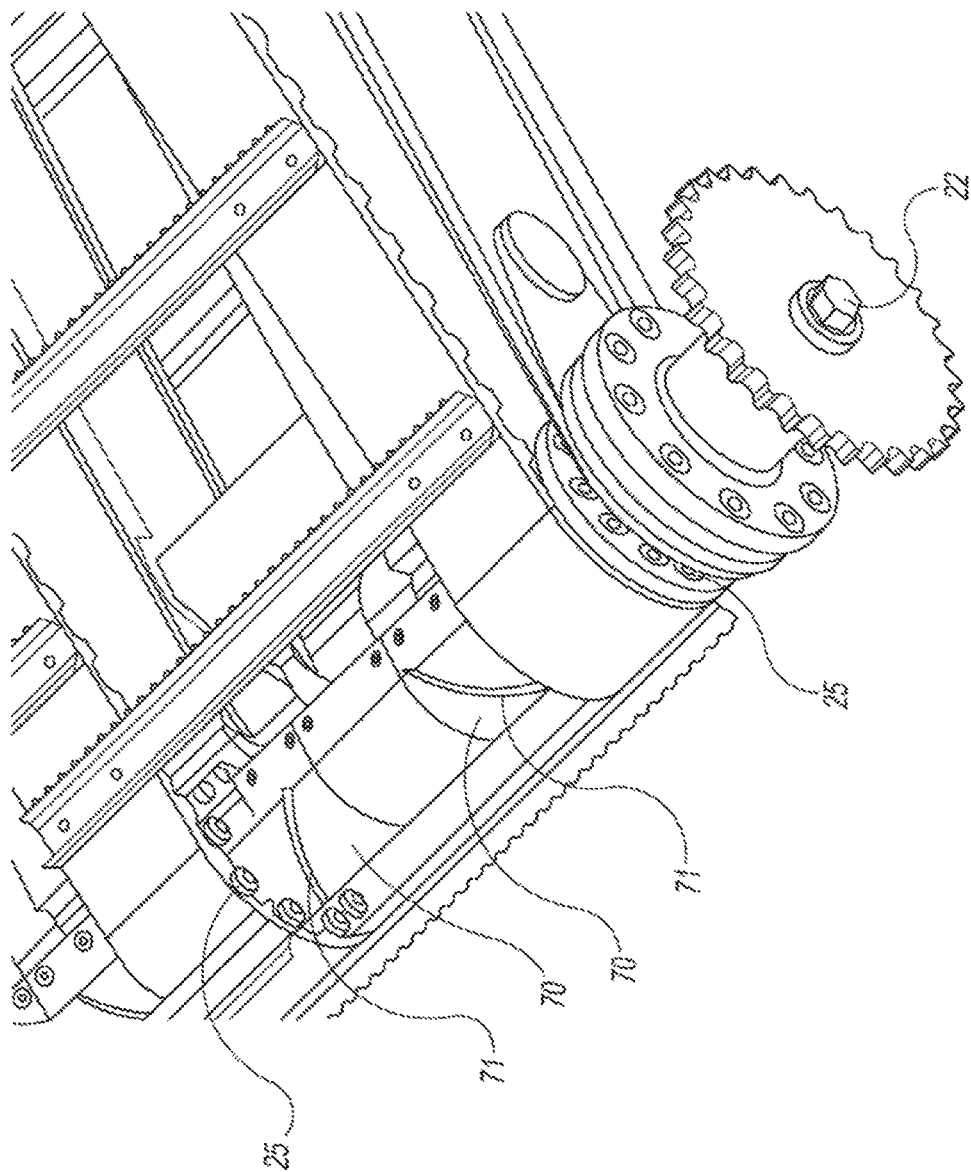
FIG. 7 is a detail of the drive shaft, including helicoidal scrapers according to an embodiment of the invention.

Another additional aspect applicable according to embodiments of the invention is illustrated in FIG. 7. Underneath and adjacent the sprockets of the sprocket wheels 25 mounted on the drive shaft 22, stationary cylinders 70 are mounted with helicoidally shaped scrapers 71 attached to the outer surface of these cylinders. These scrapers prevent crops from becoming trapped underneath the sprockets of the sprocket wheels 25. The motion of the sprocket wheels together with the helicoidal shape of the scrapers 71 ensures that any crops that enter the area between the sprockets and the cylinders 70 is moved away from the sprocket wheels. As shown in FIG. 7, similar scrapers 72 attached to stationary cylinders 73 may be installed underneath the sprocket wheels 28 on the conveyor shaft 26.

A further additional aspect according to embodiments of the invention is equally illustrated in FIG. 8. The conveyor drums mounted on the conveyor shaft 26 are provided with rectangular openings 75, for allowing access to the eccentric crank mechanism that is driving the retractable fingers 38, for example for maintenance of the crank mechanism. The openings 75 are closed by rectangular cover plates 76 during normal operation. According to an embodiment, these covers 76 are provided with serrated plates 77 along a side that is transversal to the belt movement direction, and oriented away from the plane of the cover plates 76, preferably at a right angle to the cover plates. These serrated plates 77 grab additional crop material coming from the header, and thereby increase the throughput through the feeder.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A feeder apparatus for a combine harvester, for transporting crops from a combine header towards a threshing and cleaning installation of the combine harvester, the feeder apparatus comprising:
    a feeder housing having an inlet section and an outlet section; and
    a conveyor assembly mounted in the housing, the conveyor assembly comprising:
        a frame comprising a first and a second support arm, the first and second support arms being mutually parallel and extending between the inlet and outlet sections of the housing;
        a drive shaft rotatably mounted between the first and second support arms, proximate the outlet section of the feeder housing;
        at least two sprocket wheels mounted on the drive shaft, the at least two sprocket wheels comprising sprockets;
        a conveyor shaft rotatably mounted between the first and second support arms, proximate the inlet section of the feeder housing;
        at least two sprocket wheels mounted on the conveyor shaft, at positions corresponding to the at least two sprocket wheels on the drive shaft, the at least two sprocket wheels comprising sprockets;
        toothed belts arranged around each of the at least two sprocket wheels on the drive shaft and around each of the at least two sprocket wheels on the conveyor shaft, the toothed belts comprising teeth engaging with the sprockets of the sprocket wheels mounted on the drive and conveyor shafts, so that rotation of the drive shaft actuates movement of the toothed belts;
        transversal crop transporting slats attached to adjacent ones of the belts;
        a first belt tensioning mechanism comprising a pair of first tensioning arms configured to be able to push the conveyor shaft forward with respect to the first and second support arms; and
        a second tensioning mechanism comprising a pair of second tensioning arms carrying between them and above the first and second support arms, the second tensioning mechanism further comprising a tensioning axle and tensioning rolls mounted on the tensioning axle, the belts running over the tensioning rolls, the second tensioning arms being spring-operated in a manner to be able to push the tensioning axle upwards with respect to the support arms.

2. The feeder apparatus according to claim 1, wherein front ends of the first tensioning arms are rotatably connected to the conveyor shaft and back end of each of the first tensioning arms is rotatably connected to an auxiliary axle that is itself bolted to a tensioning piece, the position of which is adjustable with respect to the frame.

3. The feeder apparatus according to claim 2, wherein the tensioning piece is connected to a tensioning bolt, the position of which is adjustable by turning the bolt with respect to a surface that is fixed to the feeder housing.

4. The feeder apparatus according to claim 1, wherein the second tensioning arms are angle-shaped, each of the second tensioning arms having an upright leg portion, a corner portion, and a level leg portion, ends of the level leg portions carrying the tensioning axle, the corner portions being rotatable about a single axis parallel to the drive shaft and the conveyor shaft, and wherein a lower end of the upright leg portion of each of the second tensioning arms is displaceable in the longitudinal direction of the support arms of the frame.

5. The feeder apparatus according to claim 4, comprising for each of the second tensioning arms:
- a rod connected at one end to the frame, the other end being threaded;
- a plunger with a central opening through which the rod is inserted, the plunger being slideable with respect to the rod, the plunger being placed in contact with the lower end of the upright leg portion of the second tensioning arm;
- a spring placed against a backside of the plunger;
- a hollow cylinder held stationary with respect to the frame, the spring being inserted in the cylinder, the rod being inserted through the spring; and
- a tensioning bolt engaging with the threaded end of the rod, so that turning the bolt compresses the spring, thereby pushing the plunger against the lower end of the upright leg portion by a force determined by the compression of the spring.

6. The feeder apparatus according to claim 1, wherein the frame is pivotable with respect to the feeder housing, about a pivot axis that coincides with the rotation axis of the drive shaft.

7. The feeder apparatus according to claim 1, wherein the frame comprises intermediate support arms parallel to the first and second support arms and positioned between the first and second support arms, the intermediate support arms being provided with longitudinal strips at their underside, the strips being configured for guiding the transversal crop transporting slats as they move along a lower portion of the feeder housing.

8. The feeder apparatus according to claim 1, wherein the drive shaft or the conveyor shaft is provided with stationary cylinders which are parallel to and concentric with the rotation axis of the drive shaft or the conveyor shaft, the cylinders extending at least underneath the sprockets of the at least two sprocket wheels mounted on the drive shaft or the conveyor shaft, the stationary cylinders comprising helicoidal scrapers at least on the portion of their surface that extends underneath the sprockets of the at least two sprocket wheels mounted on the drive shaft or the conveyor shaft.

9. The feeder apparatus according to claim 1, further comprising at least one conveyor drum mounted on the conveyor shaft and provided at one or more positions along the conveyor shaft, with one or more retractable fingers, protruding through openings in the at least one conveyor drum, and wherein the fingers are configured to protrude furthest away from the at least one drum when they pass through an area in front of the feeder housing.

10. The feeder apparatus according to claim 9, wherein the following relationships are upheld for each of the belts engaging with a sprocket wheel mounted on the conveyor shaft:

$$L_p = X.D_s = X.(T.Z_D)/R_f = X.(D_p.\pi)/R_f, \text{ with:}$$

$L_p$=the length of the neutral line of the belt, the belt comprising teeth and a flat belt portion, wherein the neutral line is perpendicular to the rotation axis of the conveyor shaft and situated at half the thickness of the flat belt portion, wherein:

X=an integer, $D_s$=the distance between two adjacent slats,

T=the pitch of the teeth on the belt, $Z_D$=the number of sprockets on a sprocket wheel mounted on the conveyor shaft, $R_f$=the number of retractable fingers at one position along the longitudinal direction of the conveyor shaft, and $D_p$=diameter of the neutral line of the belt in an area where the belt is in contact with the sprocket wheel on the conveyor shaft.

11. The feeder apparatus according to claim 9, wherein the at least one conveyor drum comprises at least one rectangular opening for providing access to the eccentric portion of the conveyor shaft, wherein the opening is closed by a removable rectangular cover plate during normal operation of the apparatus, and wherein the cover plate is provided with a plate on a side of the cover that is transversally oriented with respect to the movement of the belts, the plate being furthermore oriented away from the plane of the cover plate.

12. A combine harvester comprising a header, a threshing and cleaning installation, and a feeder apparatus according to claim 1.

* * * * *